United States Patent [19]
Ruddick et al.

[11] 4,030,449
[45] June 21, 1977

[54] PET LITTER DEODORIZING APPARATUS

[76] Inventors: Roy M. Ruddick; Marie T. Ruddick, both of P.O. Box 1627, Crystal River, Fla. 32629

[22] Filed: May 19, 1976

[21] Appl. No.: 687,652

[52] U.S. Cl. .................................................. 119/1
[51] Int. Cl.² ..................................... A01K 29/00
[58] Field of Search ................................. 119/1, 159

[56] References Cited
UNITED STATES PATENTS

| | | | |
|---|---|---|---|
| 3,316,880 | 5/1967 | Jungles et al. ........................ | 119/1 |
| 3,699,928 | 10/1972 | Cowan ............................... | 119/159 |
| 3,747,563 | 7/1973 | Brockhouse ........................ | 119/1 |
| 3,809,013 | 5/1974 | Rigney et al. ....................... | 119/1 |

Primary Examiner—G.E. McNeill
Assistant Examiner—Peter K. Skiff
Attorney, Agent, or Firm—Jack D. Slobod

[57] ABSTRACT

A spring loaded platform mounted on a base for downward movement in response to the application of the weight of a pet thereon carries a litter pan in which are vertically nested a plurality of removeable screened pans for sifting a litter medium and disposing of pet excrement. A support upstanding from the base carries an aerosol can of deodorant positioned for spraying the litter medium. A linkage carried on the support includes an arm for actuating the valve and nozzle assembly of the can in response to the upward movement of the platform as a pet leaves the litter pan. The upper movement is detected by a feeler portion of the linkage.

2 Claims, 2 Drawing Figures

PET LITTER DEODORIZING APPARATUS

FIELD OF THE INVENTION

The present invention relates generally to devices for deodorizing a pet litter. In its particular aspects, the present invention relates to apparatus for automatically actuating an aerosol container of deodorant in response to a pet leaving the pet litter.

BACKGROUND OF THE INVENTION

In the prior art, the deodorizing of an animal excrement in a litter has been accomplished primarily by the chemical nature of the particulate media forming the litter. However, these conventional litter media do not adequately deodorize when excrement is not buried in the media, or when the media is continually reused.

OBJECTS OF THE INVENTION

It is an object of the present invention to provide apparatus for dispensing a deodorizing spray automatically onto a pet litter in response to action of a pet leaving the litter.

It is a further object of the present invention to provide an apparatus for easily disposing of the pet excrement in a litter media while retaining the media for re-use.

SUMMARY OF THE INVENTION

Briefly, the aforementioned and other objects of the present invention are satisfied by providing apparatus for deodorizing a pet litter which includes a platform mounted on a base for vertical movement. A spring, acting between the platform and the base, urges the platform to an upper position. The platform moves to a lower position in response to application of the weight of a pet thereon. The platform is adapted to carry a pet litter pan thereon and a support projecting upward from the platform has means thereon for carrying an aerosol container of deodorant with the actuating valve and nozzle assembly of the container aimed for spraying deodorant onto the litter pan.

A linkage, carried by the support, includes an arm for actuating the valve and nozzle assembly in response to upward movement of the platform as caused by a pet leaving the litter. The linkage also includes a feeler for contacting the platform when the platform is located at a point intermediate the upper and lower positions. As the platform moves through this point during its upward travel it rocks the feeler, which in turn, through the action of the linkage, rocks the arm in a direction for actuating the valve and nozzle assembly.

In order to enable litter media in the pan to be used a number of times, a plurality of vertically nested screened pans are provided on the litter pan. The litter media is normally located on the uppermost pan. For removing excrement from the media, the uppermost screened pan is raised and removed carrying the excrement. The media sifts through to the next screened pan. This process can be repeated a number of times equal to the number of screened pans. Thereafter the media is disposed of. The screened pans are then replaced on the litter pan in nested relationship and fresh media is loaded therein.

Other objects, features and advantages of the present invention will become apparent upon perusal of the following detailed description of the preferred embodiment thereof when taken in conjunction with the appended drawing wherein:

DETAILED DESCRIPTION

Figure 1:
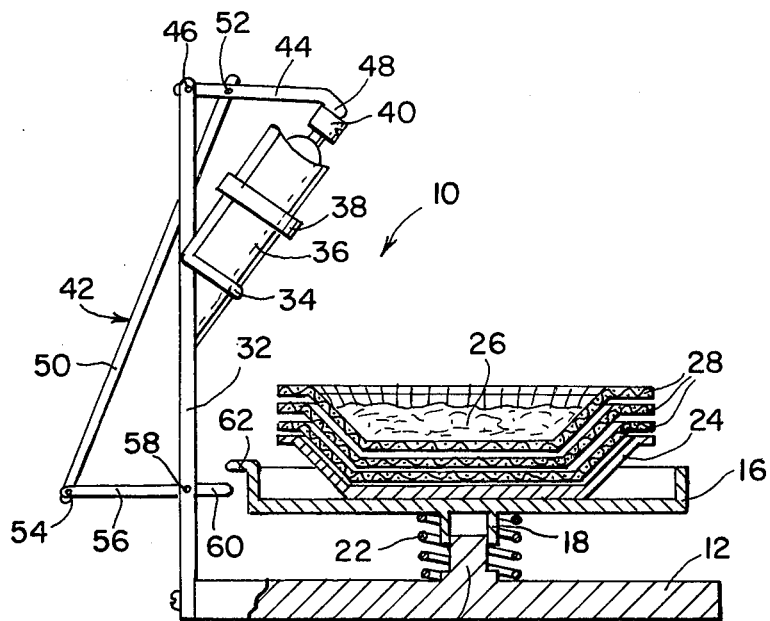
FIG. 1 is a partially cross-section front elevational view of the pet litter deodorizing apparatus of the present invention with its parts positioned as prior to the use of the litter by a pet.
Figure 2:
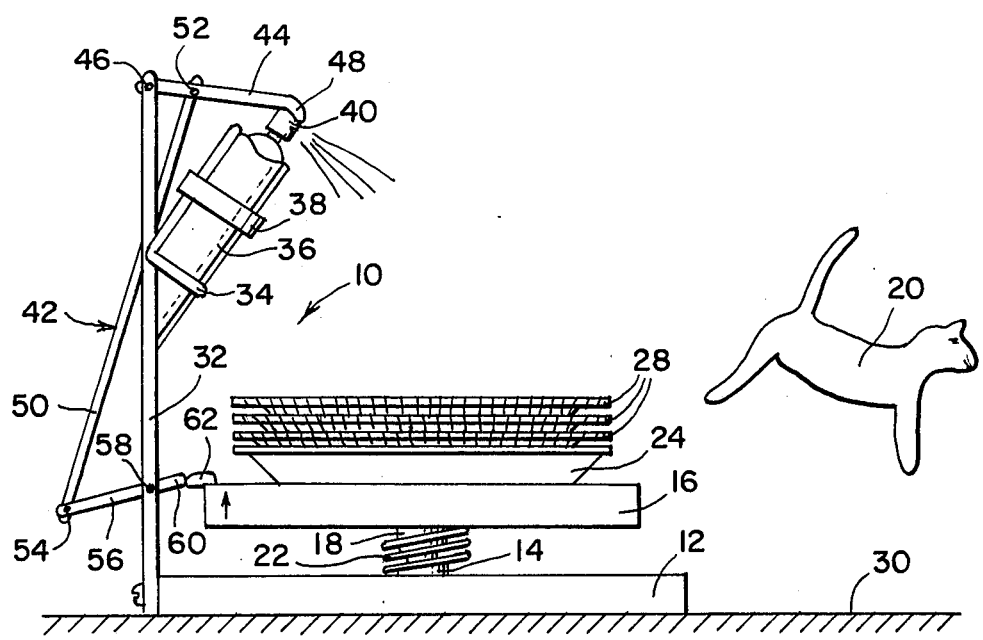
FIG. 2 is a front elevational view of the pet litter, similar to FIG. 1, but with its parts positioned in the process of movement just after the pet has left the litter.

Referring to FIGS. 1 and 2 of the drawing the pet litter deodorizing apparatus of the present invention is generally indicated by the reference numeral 10. Apparatus 10 includes a generally planar base 12 having an upstanding cylindrical column 14. A platform 16, disposed directly above base 12, includes a downwardly directed tubular element 18 or sleeve slidingly fitted about column 14. Element 18 has a closed upper end for entrapping air therein in order that column 14 and element 18 form a dashpot or shock absorber for restricting the platform 16 to move smoothly downward in response to the application of the weight of a pet cat 20 thereon. A helical spring 22, coaxially positioned about element 18, acts between platform 16 and base 12 to normally urge the platform 16 to the upper position shown in FIG. 1.

The platform 16 carries a conventional litter pan 24. In order to facilitate disposal of pet excrement and re-use of a granular litter media 26 a plurality of screened pans 28 are provided generally in the shape of pan 24. Screened pans 28 are stacked in vertically nested relationship lining pan 24. When it is desired to remove solid excrement from media 26, the uppermost one of screened pans 28 is lifted and removed carrying the excrement with it for disposal while media 26 sifts therethrough and into the next one of screened pans 28. The removed pan is stored. When the media 26 is to be cleaned again, the next screened pan 28 is lifted in the same manner. It will be appreciated that this process can be repeated as many times as there are screened pans 28. When the last screened pan 28 is lifted, the media 26 which falls into pan 24 is disposed of. Thereafter the screened pans 28 and litter pan 24 are again set up as in FIG. 1 with fresh media 26.

It will be appreciated that when the pet cat 20 is positioned in the litter pan 24, the platform will move downward smoothly. When the cat 20 jumps from the pan 24 to the ground 30, platform 16 will move upward smoothly to the position illustrated in FIG. 1.

A vertical support 32 projects upward from base 12. Support 32 carries at a point proximate its upper end, an inclined seat 34 which receives an aerosol can 36 of deodorant. Can 36 is retained on seat 34 by a band 38. Can 36 is oriented and positioned in a manner that its actuating valve and nozzle assembly 40 is aimed for spraying deodorant toward platform 16 and onto media 26.

In order to automatically actuate valve and nozzle assembly 40 each time excrement is introduced into media 26, it is necessary to actuate assembly 40 in response to upward movement of platform 16 caused by cat 20 leaving the platform. To this end, a linkage 42 is provided which includes an arm 44 pivotly mounted at one end to a point 46 at the top of support 32 and having its other end 48 positioned to engage the top of assembly 40. A generally vertical link 50 is pivotly mounted at its upper end to a point 52 intermediate the length of arm 44. The lower end of link 50 is pivotly mounted at point 54 to one end of an arm or lever 56. Lever 56 is pivotly mounted to support 32 at a point 58 intermediate its length. The other end 60 of lever 56 serves as a feeler which projects toward platform 16 and is adapted to be engaged or struck by a tab 62 projecting from the platform as the platform moves between its lower and upper positions..

As shown in FIG. 1, the tab 62 is normally located above the feeling end 60 of lever 56. When the cat 20 positions himself on platform 16, the platform moves downward and the tab 62 passes below end 60 rocking lever 56 clockwise. It will be appreciated that a clockwise rotation of lever 58 causes end 48 of arm 44 to move upward rather than downward. Consequently, the assembly 40 of can 36 is not actuated. However when cat 20 jumps from the litter pan 24 on platform 16, the platform rises and passes through the position shown in FIG. 2 where lever 56 is rocked counterclockwise to move the end 48 of arm 44 for actuating assembly 40 to thereby spray deodorant onto media 26.

While the preferred embodiment of the present invention has been described and illustrated in specific detail, it should be understood that numerous modifications, additions and omissions in the details thereof are possible within the intended spirit and scope of the invention claimed herein.

What is claimed is:

1. Apparatus for deodorizing a pet litter comprising: a base; a platform mounted on said base for vertical movement; spring means acting between said platform and said base for urging said platform to an upper position, said platform adapted to move to a lower position in response to the application of the weight of a pet to said platform, said platform being adapted to carry a pet litter pan thereon; a support projecting upward from said base means on said platform for carrying an aerosol container of deodorant with the actuating valve and nozzle assembly of said container aimed for spraying said deodorant toward said platform; a linkage means carried by said support for actuating said valve and nozzle assembly in response to upward movement of said platform from the lower to the upper position, said linkage means including a feeler adapted to engage said platform when said platform is in a position intermediate said upper and lower positions.

2. The apparatus of claim 1 further comprising said pet litter pan positioned on said platform; a plurality of vertically nested screened pans in said litter pan; an uppermost one of said screened pans being adapted to receive a litter medium; whereby said uppermost screened pan can be raised and removed for disposing of pet excrement while said litter media sifts through said uppermost pan to the next uppermost screened pan.

* * * * *